Aug. 5, 1969

H. W. DE YARMETT ETAL 3,459,442

SUBSEA PIPE COUPLING APPARATUS

Filed Nov. 29, 1967

INVENTORS:
HARRY W. DE YARMETT
MURRY F. JOHNSON

BY: A. H. McCarthy

THEIR AGENT

INVENTORS:
HARRY W. DE YARMETT
MURRY F. JOHNSON
BY: A. H. McCarthy
THEIR AGENT 3,459,442
SUBSEA PIPE COUPLING APPARATUS
Harry W. De Yarmett, Metairie, and Murray F. Johnson, Arabi, La., assignors to Shell Oil Company, New York, N.Y., a corporation of Delaware
Filed Nov. 29, 1967, Ser. No. 686,563
Int. Cl. F16l 35/00, 55/00, 37/18
U.S. Cl. 285—27                                                5 Claims

ABSTRACT OF THE DISCLOSURE

An underwater pipe coupling apparatus in which specially formed mating pipe ends are axially aligned by cooperating guide means carried by each pipe end and the ends pulled together in coupled relationship by a cable puller carried by one pipe end which acts on a cable attached to the guide means of the other pipe end.

BACKGROUND OF THE INVENTION

This invention relates to a pipeline coupling apparatus and more particularly to an underwater coupling apparatus for aligning and connecting two underwater pipe sections in fluidtight end-to-end coupling relationship.

Underwater pipelines positioned on the floor of a body of water are being employed to an ever greater extent particularly in conjunction with oil and gas wells drilled at offshore locations. Generally, one or more pipelines are laid along the floor of the body of water and connected to the underwater well to handle the offtake of oil or gas produced from the well. The pipelines may extend to a suitable processing facility on shore or to an underwater storage tank. In addition, underwater pipelines may be employed to handle other fluids such as water which are supplied to offshore installations or "platforms" for use in drilling operations.

Whatever the application, an underwater pipeline laid along the floor of a body of water generally requires at least one pipe connection which must be performed underwater. For example, in the case of a production platform, a pipeline or "flowline" is laid between a desired terminus and the platform to handle the produced gas and oil. At the platform, the flowline is connected to a "flowliner riser" which is attached to the platform and extends to the working surface of the platform above the water. The riser is there connected through suitable piping to a marine conductor pipe in communication with the well so that fluid communication is established between the well and the flowline. In present practice, the connection of the flowline to the riser is typically performed by deep sea divers working on the ocean floor. Since a diver's mobility is necessarily hampered by his environment, the task of connecting pipe sections underwater often becomes exceedingly difficult and time consuming. In addition, end-to-end pipe alignment is almost always a problem and as the size of the pipe increases the diver experiences greater difficulty in manipulating the pipe sections into alignment. Furthermore, visibility is often impaired due to murky water and increased depths. The diver's "down time," that is, the period in which he can perform work, is often limited by the depth of water in which he is working and/or high water current velocity due to wave action or extreme tides. Such extreme tides are experienced, for example, in the Cook Inlet on the southern coast of Alaska where tides in the order of 15 feet limit the diver's work period to the brief interval between ebb and flood tides known as "slack tide."

In view of these problems, the cost of making underwater pipe connections may run well into the thousands of dollars. Accordingly, there exists a need for an improved method and apparatus for aligning and connecting underwater pipe sections both in terms of simplifying the operation and reducing the time necessary to complete a connection so that a better connection can be made at a reduced cost. It is to this end that the subject invention is directed.

SUMMARY OF THE INVENTION

It is a primary object of this invention to provide an improved apparatus for connecting underwater pipe sections.

It is a further object to provide an apparatus which aligns the pipe sections in the end-to-end relationship.

A still further object of the apparatus of this invention is to pull the pipe sections into mating coupling relationship.

Another object of the invention is to lock the pipe sections together after they are pulled together.

Still another object is to provide an apparatus which is easily handled by deep sea divers and hydraulically actuated.

These and other objects will become apparent from the ensuing description of the invention.

More specifically, the subject invention provides a relatively compact, easily handled apparatus for pulling together two pipe sections in end-to-end coupling contact while at the same time axially aligning the ends. In accordance with the invention at least a portion of the apparatus is removable so that it may be reused and is preferably hydraulically actuated. Furthermore, the apparatus may be readily handled by a deep sea diver and requires only a minimum of manual manipulation and effort.

Figure 1:
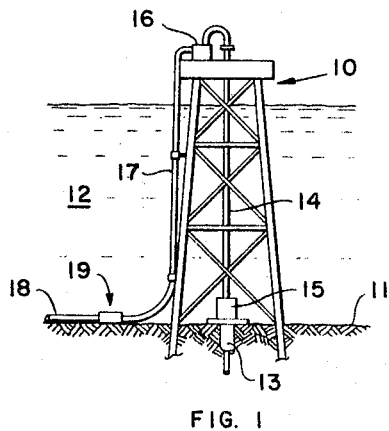
FIGURE 1 is an elevational view of an offshore platform showing an underwater flowline connected to a flowline riser which connection can be made with the subject apparatus.

A typical environment where the joining together of pipelines underwater is necessary is shown in FIGURE 1 which discloses an offshore installation 10 supported on the floor 11 of a body of water 12. The installation is a so-called production platform used in establishing communication with and servicing an offshore oil or gas well 13 drilled into the floor 11 of the body of water 12. A marine conductor pipe 14 supported by the upper end of the platform 10 is connected in fluid communication with a production wellhead 15 attached to the well 13 for handling the offtake of produced gas or oil from the well. The marine conductor pipe 14 is connected at its upper end to suitable processing equipment, for example, a separator 16 supported by the platform 10. A so-called "flowline riser" 17 is attached to the platform 10 with its upper end in fluid communication with the separator 16 and its lower end connected to a flowline 18 laid along the floor 11 of the body of water 12 by a pipe connector indicated generally by the numeral 19. The flowline 18 carries the produced gas or oil to a suitable storage or processing facility (not shown) located at some remote point underwater or on shore.

The apparatus of the subject invention is utilized in making the underwater pipe connection 19. Although a flowline-to-"flowline riser" connection is shown in FIGURE 1, it will be understood that the subject apparatus may be employed for making any type of underwater pipe connection and hence the invention is not limited to the particular environment disclosed in FIGURE 1. Numerous other instances requiring underwater pipe connections would be readily apparent to one skilled in the art, for example, when repairing underwater flowlines or when connecting feeder pipelines to a main collector pipeline.

Figure 2:
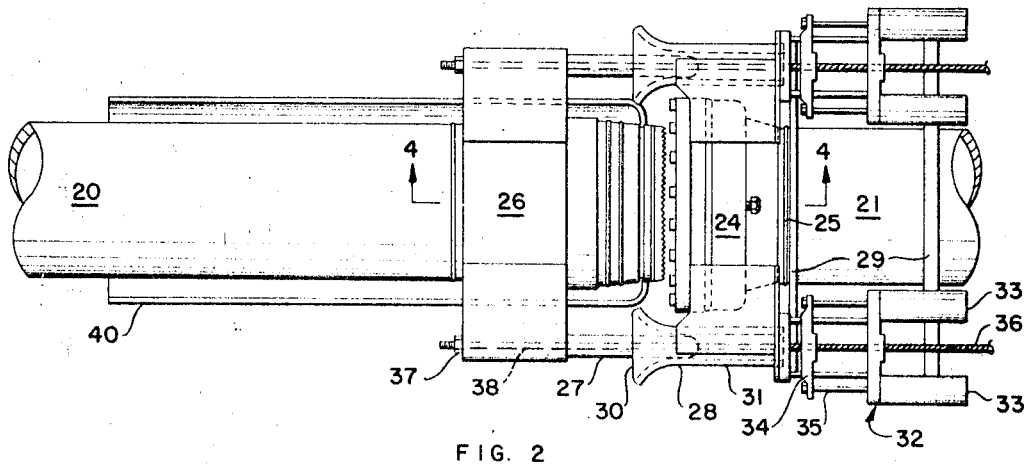
FIGURE 2 is a plan view of two pipeline sections being joined by the apparatus of the subject invention.

Referring now to FIGURE 2, a pair of pipe sections 20 and 21 are shown just prior to being connected. The pipe sections 20 and 21 could be, for example, the terminal sections of flowline 18 and the flowline riser 17 shown in FIGURE 1 or they could be any pipe sections to be connected underwater. The pipe section 20 is provided with a male coupling end 22 which is attached to the pipe section 20 by suitable means, for example, weld 23. A female coupling end 24 is similarly attached to the pipe section 23 by weld 25 or other suitable means. The male end 22 is fitted with a slip ring 26 freely rotatable thereabout. Attached to the slip ring 26 are a pair of diametrically opposed longitudinally extending alignment pins 27. A pair of equally spaced longitudinally extending alignment horns 28 for receiving the alignment pins 27 are carried by the female end 24. The horns 28 are attached to a yoke member 29 shaped to partially surround and rest against the pipe section 21 when the horns 28 are in place as shown in FIGURE 2. The horns 28 include a flared mouth portion 30 and a hollow throat section 31 for receiving the alignment pins 27.

Also attached to the throat end of the horns are pulling means in the form of cable-pulling units indicated generally by the numeral 32. Each of the pulling units 32 include a pair of hydraulic cylinders 33 and a cable gripper 34. The cylinders 33 are attached to a yoke 39 that bears against pipe section 21. A piston, not shown, carried in each cylinder 33 is connected to a rod 35 which in turn is attached to the cable gripper 34 so that when the cylinders 33 are actuated by supplying hydraulic fluid to the cylinder through suitable hoses (not shown), the cable gripper 34 is pulled towards the cylinders 33. A cable 36 is attached to the rotating ring 26 by suitable means, for example, nuts 37 and extends through a bore 38 drilled through the ring 26 and pin 27. The cable is sufficiently long to be threaded through the throat 31 of the horn 28 and past the cable gripper 34. The details of the gripper 34 are not shown in FIGURE 2 but it will be apparent to one skilled in the art that the gripper 34 may incorporate any type of cable gripping or clamping mechanism, for example, slips, one-way sprags or a mechanical clamp so long as the gripper 34 will engage and hold the cable 36 when the cylinders 33 are actuated to move the gripper 34 to the right as shown. In addition, the gripping mechanism permits the gripper 34 to be moved to the left as in FIGURE 2 so that the gripper can be indexed to sequentially pull the cable 36 during operation as will now be described.

In operation, pipe sections 20 and 21 are laid on the floor of a body of water in rough alignment and slightly spaced apart. The rotatable ring 26 with the alignment pins 27 is attached to the male end 22 of the pipe section 20 and lowered with it. However, it will be noted that the ring 26 could be attached after the pipe section 20 is in place without departing from the scope of the invention. As hereinafter described, the pipe section 21 is held stationary so that pipe section 20 is pulled into contact with section 21 although it is contemplated that pipe section 21 could be moved towards pipe section 20 or both sections could be moved toward each other depending upon the particular pipe sections being joined.

Figure 4:
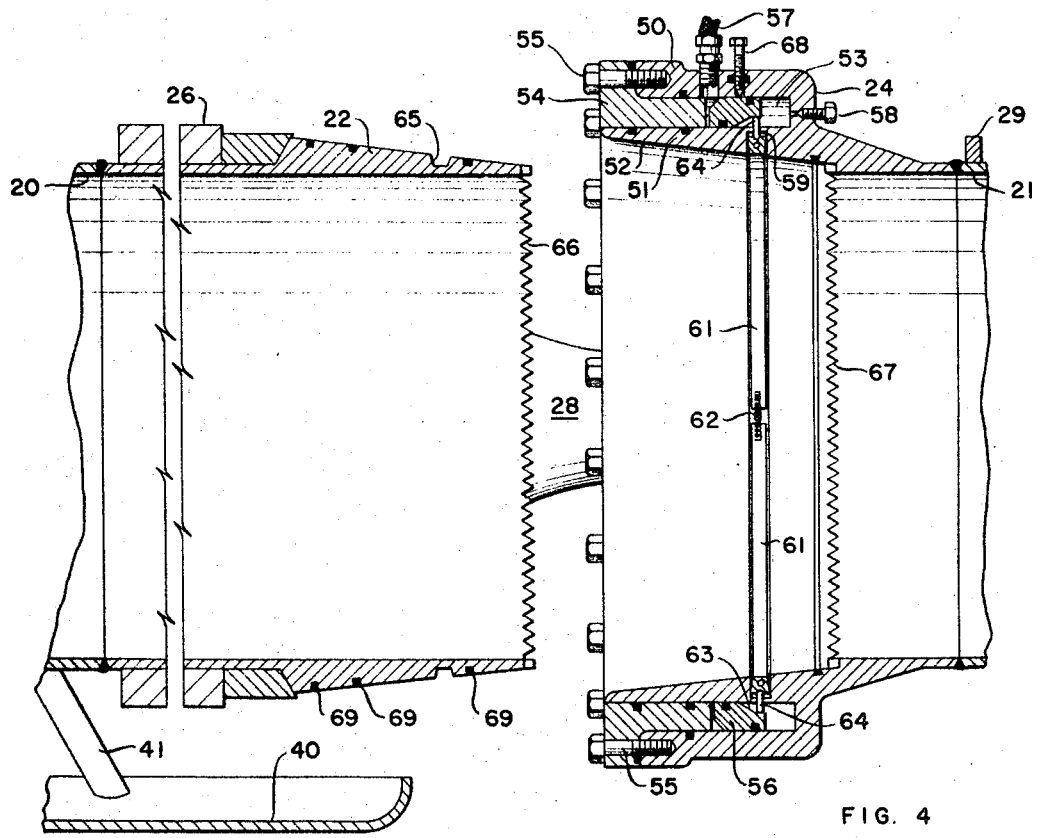
FIGURE 4 is a cross-sectional view in enlarged scale taken along the line 4—4 in FIGURE 2.

A portable sled or skid pan 40 is preferably positioned under pipe section 20 and male end 22 and removably connected thereto by suitable support means in the form of bracing 41 (see FIGURE 4). The skid pan 40 serves to protect the male end 22 and keep it off the mud on the water floor and further helps in aligning the pins 27 and the horns 28.

Figure 5:
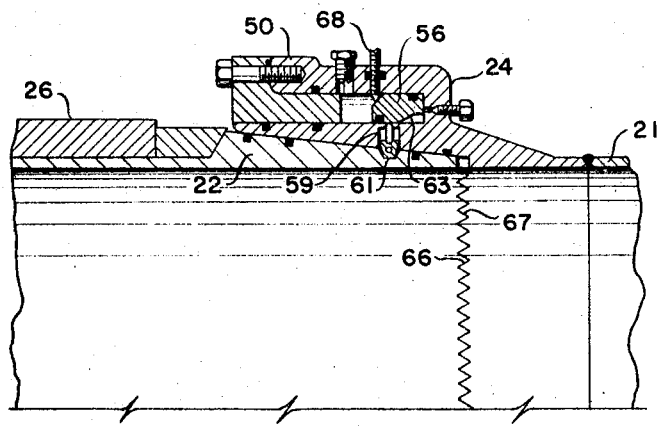
FIGURE 5 is a cross-sectional view in enlarged scale taken along the line 5—5 in FIGURE 3.

After the pipe sections 20 and 21 are positioned on the water floor, the entire assembly consisting of the horns 28, pulling units 32 and yokes 29 and 39 are lowered and placed in position on the pipe section 21 and female end 22 as shown in FIGURE 2 by a deep sea diver operating on the water floor. In addition, the diver also connects the cable 36 to the ring 26 through each pin 27 and threads the cable through the respective alignment horns 28. The cables are operatively connected to the cable grippers 34 which are in their fully protracted position as shown in FIGURE 2. The cylinders 33 which may be coupled in slave relationship are then simultaneously actuated to retract the grippers 34 which pulls the cables 36 thus pulling the pins 27 into the horns 28. If the travel of the cylinders is insufficient to fully mate the male and female pipe ends 22 and 24, respectively, the cable grippers 34 may be released either automatically or mechanically from the cables 36 and again protracted by the cylinders 33 to a position shown in FIGURE 2 where they re-grip the cables and the cylinders again actuated. This cycle may be repeated as many times as necessary until the pipe ends 22 and 24 are fully mated as shown in FIGURES 3 and 5.

Figure 3:
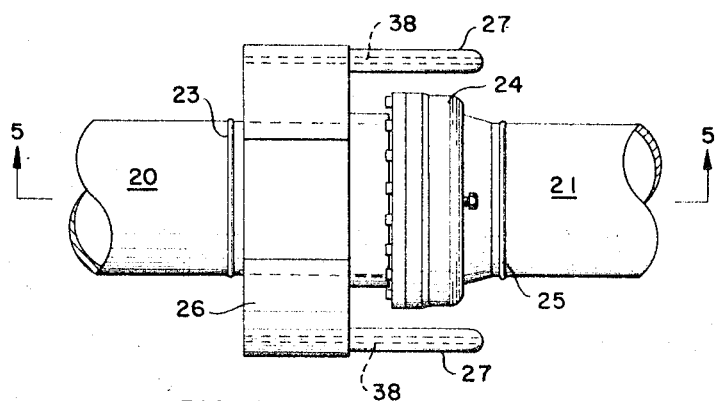
FIGURE 3 is a similar plan view of the same pipe sections after they are connected and a portion of the subject apparatus removed.

The horns 28, pulling units 32, cables 36 and skid pan 40 may then be removed and retrieved to the surface for subsequent use leaving the completed assembly shown in FIGURE 3 on the water floor.

Figure 6:
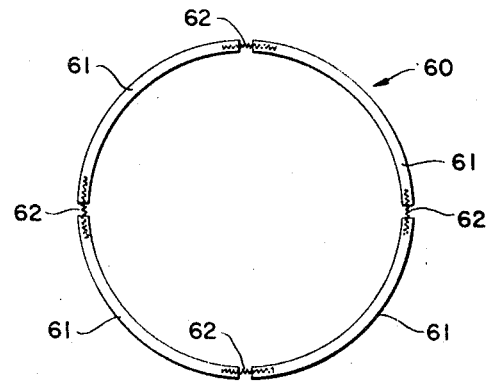
FIGURE 6 is a plan view of a split ring assembly used to lock the pipe sections together after they are mated.

The locking mechanism for locking the pipe ends 22 and 24 together will now be described with reference to FIGURES 4 and 5. The female end 24 includes a cylindical outer housing 50 and an inner housing 51 having a tapered mating surface 52 which mates with the male pipe end 22 when the pipe ends 22 and 24 are brought together. The annular housings 50 and 51 define a chamber 53 therebetween which is closed by flange 54 connected to the outer housing 50 by a plurality of circumferentially spaced bolts 55. Housed within the chamber 53 is an annular piston member 57. The chamber 53 on one side of the piston is supplied with pressurized hydraulic fluid through hose 57 and the chamber 53 on the other side of the piston is vented through vent 58 in the wall of housing 50. The inner housing 51 is recessed to form an annular groove 59 for receiving a split-ring assembly 60 (see also FIGURE 6) comprised of annular ring segments 61 separated by compression springs 62 which serve to normally bias the ring segments 61 into the annular groove 59. The annular piston element 56 includes a tapered cam surface 63 that acts against a plurality of radial pins 64 which are carried in the walls of the inner housing 51. The pins 64 extend through the housing 51 and bear against the outer surface of the ring segments 61. An annular groove 65 formed about the outer periphery of the male end 22 is adapted to receive the ring segments 61 when the male end 22 and female end 24 are pulled into mating relationship. The end of the male end 22 is preferably provided with spline teeth or serrations 66 which mate with similar spline teeth or serrations 67 formed in the female end 24 when the ends are brought together. The spline teeth prevent rotational or torsional movement between the pipe ends 22 and 24 when the ends are brought together.

An alternate design for the split-ring segments 61 which would have the advantage of reducing the required wall thickness in the male end 22 would be to have V grooves similar to coarse pipe threads located on the inside surface of the ring segments 61 and have similar mating annular V grooves located above the periphery of the male end 22 in place of a single groove 65.

In operation, the female end 24 as shown in FIGURE 4 is conditioned to receive male end 22. No hydraulic pressure is supplied to the left side of the piston element 56 so that sea water acting through the vent 58 serves to force the piston element 56 to the left as shown. This permits the compression spring 62 to bias the ring segment 61 into groove 59 so that the ring segments 61 do not interfere with the entry of the male end 22. After the male end 22 is fully pulled into the female end 24 so that spline teeth 66 and 67 mesh as shown in FIGURE 5, hydraulic pressure is supplied through the line 57 to drive the piston element 56 to the right as shown in FIGURE 5. The cam surface 63 on the piston element in turn forces the pins 64 inwardly against the ring segment 61 to force the segments into the annular groove 65 in the male end 22 thus locking the ends 22 and 24 together. Set screw 68 carried in the outer housing 54 may then be turned in as shown in FIGURE 5 to bear against the piston element 56 to mechanically lock the piston element 56 in the position shown in FIGURE 5 so that the hydraulic hose connection may then be removed.

Suitable sealing elements 69 carried by the male end 22 assure a fluidtight connection but are not essential to the invention. If it is desired to disconnect the coupling in the future, set screw 68 may be turned out to permit the piston element 56 to be moved to the left so that ring segments 61 can retract into groove 59. If the pressure created by the sea water through vent 58 is insufficient to move piston element 56, an auxiliary pressure source (not shown) may be applied through vent 58.

Although in the description of the invention thus far the horns 28 have been described as being removable, it will be understood that, alternatively, the horns 28 may be fixedly attached to the female coupling end 24 to provide additional rigidity to the assembly. When the horns are so affixed, they remain in place after the pipe sections are made up as shown in FIGURE 3. The pulling units 32 may still be retrieved, however, if they merely rest against appropriate seats on the throat end of the horns 28 rather than being attached to the horns as described above.

In addition, is should be noted that the rotatable ring 26 with the alignment pins 27 may be removably attached to pipe section 20 so that it can be retrieved. Thus, it will be seen that in the practice of the invention any or all of the alignment parts consisting of rotatable ring 26, pins 27, horns 28 and pulling units 32 may be so attached to the pipe sections 20 and 21 so as to permit subsequent retrieval, or if desired, any or all of the alignment parts may be firmly attached to remain in place after the pipe ends are coupled.

Having thus described the invention, what is claimed is:

1. An underwater coupling apparatus for aligning and connecting two underwater pipe sections in fluidtight end-to-end coupling relationship, said apparatus comprising:
    a first pipe section having a male end;
    a second pipe section having a female end adapted to mate with said male end;
    said male and female ends being formed with tapered annular mating surfaces;
    mating teeth formed on said ends to prevent rotational movement between the pipe sections when they are brought together;
    locking means carried by one of said ends and adapted to cooperate with the other of said ends for locking said pipe ends together when mated;
    first longitudinally extending guide means comprising at least two pin members carried by a ring mounted on one of said pipe sections;
    second longitudinally extending guide means comprising at least two hollow horn members carried by the other of said pipe sections and adapted to matably receive said first guide means for aligning said pipe ends in end-to-end coupling relationship;
    at least one of said guide means being rotatably and removably mounted about said pipe section; and
    pulling means removably mounted on one of said pipe sections adjacent one of said guide means, said pulling means including individual pulling units attachable to each horn member and cable means connectable from each of said units to each of said pin members for pulling said first and second guide means into mating contact to thereby align and place said pipe ends in end-to-end coupling relationship.

2. An apparatus as defined in claim 1 wherein said cable means extend through said horn members.

3. An apparatus as defined in claim 1 wherein said locking means comprise a normally retracted split ring assembly carried in an annular recess in said female end and wherein said male end is provided with an annular groove for receiving said split ring assembly.

4. An apparatus as defined in claim 3 including hydraulically operated actuating means carried by said female end for moving said split ring assembly into said annular groove in said male end to thereby lock said ends together.

5. An apparatus as defined in claim 4 wherein said split ring assembly comprises ring segments and compression springs carried between the ends of said ring segments to normally bias said rings segments into said annular recess in said female end.

References Cited
UNITED STATES PATENTS

| | | | |
|---|---|---|---|
| 3,191,696 | 6/1965 | Pollard et al. | 166—.6 X |
| 3,260,270 | 7/1966 | Watkins et al. | 285—18 X |
| 3,321,217 | 5/1967 | Ahlstone | 285—18 |
| 3,361,453 | 1/1968 | Brown et al. | 285—330 X |
| 3,378,066 | 4/1968 | Otteman et al. | 166—.5 |

CARL W. TOMLIN, Primary Examiner

D. W. AROLA, Assistant Examiner

U.S. Cl. X.R.

166—0; 285—90, 315, 321, 330, 332, 351